United States Patent [19]

Citta

[11] Patent Number: 4,553,161

[45] Date of Patent: Nov. 12, 1985

[54] UPSTREAM DATA PACKET TIME SLOT SYNCHRONIZATION WITH DOWNSTREAM VBI FOR TWO-WAY CATV SYSTEM

[75] Inventor: Richard W. Citta, Oak Park, Ill.

[73] Assignee: Zenith Electronics Corporation, Glenview, Ill.

[21] Appl. No.: 648,569

[22] Filed: Sep. 6, 1984

Related U.S. Application Data

[63] Continuation-in-part of Ser. No. 560,028, Dec. 9, 1983, abandoned.

[51] Int. Cl.$^4$ .......................... H04N 7/10; H04N 7/14
[52] U.S. Cl. ............................................ 358/86; 455/5
[58] Field of Search ................... 358/84, 86, 122, 123, 358/124, 147; 455/2, 4, 5

[56] References Cited

U.S. PATENT DOCUMENTS

| | | | |
|---|---|---|---|
| 3,769,579 | 10/1973 | Harney | 358/84 |
| 3,882,392 | 5/1975 | Harney | 455/4 |
| 3,919,462 | 11/1975 | Hartung et al. | 358/124 X |
| 3,997,718 | 12/1976 | Ricketts et al. | 358/84 |
| 4,250,524 | 2/1981 | Tomizawa | 358/84 X |
| 4,398,289 | 8/1983 | Schoute | 370/93 |
| 4,398,298 | 8/1983 | Van Egmond et al. | 375/7 |
| 4,430,731 | 2/1984 | Gimple et al. | 358/84 X |
| 4,454,538 | 6/1984 | Toriumi | 358/86 |

*Primary Examiner*—Keith E. George

[57] ABSTRACT

Synchronization of upstream data packet time slots with the vertical blanking interval (VBI) of a video signal transmitted downstream from the headend is provided in a two-way cable television (CATV) system. Coded data transmitted during a designated VBI line from the CATV headend is compared with system data stored in each subscriber terminal for generating a match signal. The match signal is used to interrupt a microcomputer which then divides the next video signal raster scan field into 8 equal time slots during any one of which an upsteam data packet may be transmitted. Upstream data is thus accurately synchronized with a downstream vertical scan rate signal in reducing the likelihood of collisions between upstream data packets and increasing through-put in a two-way CATV system.

16 Claims, 4 Drawing Figures

UPSTREAM DATA PACKET TIME SLOT SYNCHRONIZATION WITH DOWNSTREAM VBI FOR TWO-WAY CATV SYSTEM

CROSS-REFERENCE TO RELATED APPLICATION

This application is a continuation-in-part of application Ser. No. 560,028, filed Dec. 9, 1983, now abandoned, and is related to but in no way dependent upon the following application which is assigned to the assignee of the present application: Ser. No. 560,029, filed Dec. 9, 1983, abandoned in favor of continuation-in-part application Ser. No. 648,841, filed Sept. 6, 1984 entitled "Two-Way CATV System With AML Commands" in the name of Richard W. Citta.

BACKGROUND OF THE INVENTION

This invention relates generally to cable television (CATV) systems and is particularly directed to a two-way CATV system in which upstream data transmission timing is provided by downstream headend generated signals.

CATV systems typically include a central master source of television programming information termed a headend which imparts programs, or groups of programs at different assigned frequencies, to a network of cable connections which, through various distribution and selection network components, ultimately terminate in a branched out plurality of user terminals typically in residences or commercial establishments. CATV program signals are broadcast from the headend to individual subscribers in a "downstream" direction over different assigned carrier frequencies typically from about 50 to 450 MHz. The CATV headend not only transmits television programming information downstream, but may also transmit subscriber address and authorization codes which allow for headend control of subscriber program decode authorization status.

In a two-way CATV system each subscriber is able to transmit signals back to the CATV headend. These subscriber-originated signals may include program purchasing requests, opinion poll responses, and CATV converter status information. These upstream signals make use of out of band frequencies in the 5–32.5 MHz band. The upstream signal distribution network is in the form of a "merging tree topology" in which the signals generated by many sources, or subscribers, converge and are transmitted on a single transmission line back to the CATV headend. Such techniques as signal multiplexing and frequency diversity have been proposed and are utilized to accommodate large numbers of subscribers in a two-way CATV system.

In the upstream signal multiplexing approach the timing of subscriber upstream transmissions is, of course, critical particularly in CATV systems having large numbers of subscribers. Some prior art two-way CATV systems utilize a polling arrangement in which headend generated timing signals typically provided during the vertical blanking interval (VBI) are used to initiate the sequentially timed upstream transmissions of the system subscribers. U.S. Pat. No. 3,769,579 to Harney discloses a CATV system in which each television receiver has a transponder. The transponders are all interrogated by a common start signal, following which a series of clock pulses are provided to the various transponders for controlling their responses. The various periods of reply of the transponders are sequential, with the periods being controlled by the clock signals so that predetermined groups of television receivers reply during predetermined time intervals. The replies from each of the interrogated transponders occur in the period between vertical blanking intervals. U.S. Pat. No. 3,882,392 also to Harney discloses another approach to synchronizing subscriber upstream transmissions in a subscription television system. In this approach the central station (headend) clock is derived from local power frequency and the clock signals at each receiver are derived from the power frequency at the local receiver. Thus, in a hotel or motel situation where the subscription television system operates from a single power source, the central station and all the receivers will operate off of the in-phase local power and the clock signals at both the central station and each receiver will be synchronized. The former approach requires that a transponder be provided for each subscriber, while the latter approach is intended for a television signal distribution system having a common power source which is impractical for most CATV systems which cover large geographic areas and encompass large numbers of subscribers.

A second approach taken in two-way CATV systems involves a contention arrangement in which simultaneous access of the shared media by two or more subscribers is resolved in a predetermined manner. For example, U.S. Pat. No. 4,398,298 to Van Egmond et al. discloses an arrangement in which the transmitting and receiving stages of each station are connected to the cable. The transmitter of a station requesting media access provides a signal of predetermined logic value on the connecting line by changing its output impedance, which logic signal automatically switches off the transmitter of each of the other stations. Another data transmission packet contention system makes use of an approach generally termed "Aloha" which involves the random transmission within a designated time period by those subscribers desiring shared media access. The simultaneous transmission of more than one subscriber results in the collision and mutilation of data packets and unsuccessful headend communications. This is typically followed by another random transmission by the unsuccessful subscriber who may or may not receive a response (acknowledgement) from the headend depending upon upstream data traffic density. In order to increase the rate of successful transmissions, the basic "Aloha" arrangement has been modified into a "slotted Aloha" arrangement wherein the headend transmits a synchronizing signal indicating the beginning of a frame which is divided into a sequence of time slots of mutually equal lengths. Each subscriber transmits a data packet to the headend within a given time slot which is randomly selected from the sequence of time slots. The "slotted Aloha" approach is generally twice as efficient as the basic "Aloha" arrangement in reducing the number of upstream data packet collisions.

One approach to a slotted "Aloha" arrangement is disclosed in U.S. Pat. No. 4,398,289 to Schoute wherein the main station, or headend, determines the number of time slots in the next frame based upon a determination of the number of unmutilated, empty and mutilated time slots in preceding frames. The number of time slots in a given frame is then transmitted as part of the synchronizing signal to each subscriber terminal.

The present invention is intended to overcome the aforementioned limitations of the prior art by providing a time-slotted "Aloha" two-way CATV system using contention techniques for upstream data communication in which upstream data transmission synchronization is based on downstream program VBI timing.

OBJECTS OF THE INVENTION

Accordingly, it is an object of the present invention to provide improved data transmission in a two-way CATV system.

It is another object of the present invention to provide increased upstream data through-put in a two-way CATV system.

Yet another object of the present invention is to accurately synchronize the upstream data transmissions of a plurality of CATV subscribers.

A further object of the present invention is to control the timing of the upstream transmissions of a plurality of CATV subscribers utilizing a regularly recurring component of the downstream program signal transmission.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1:
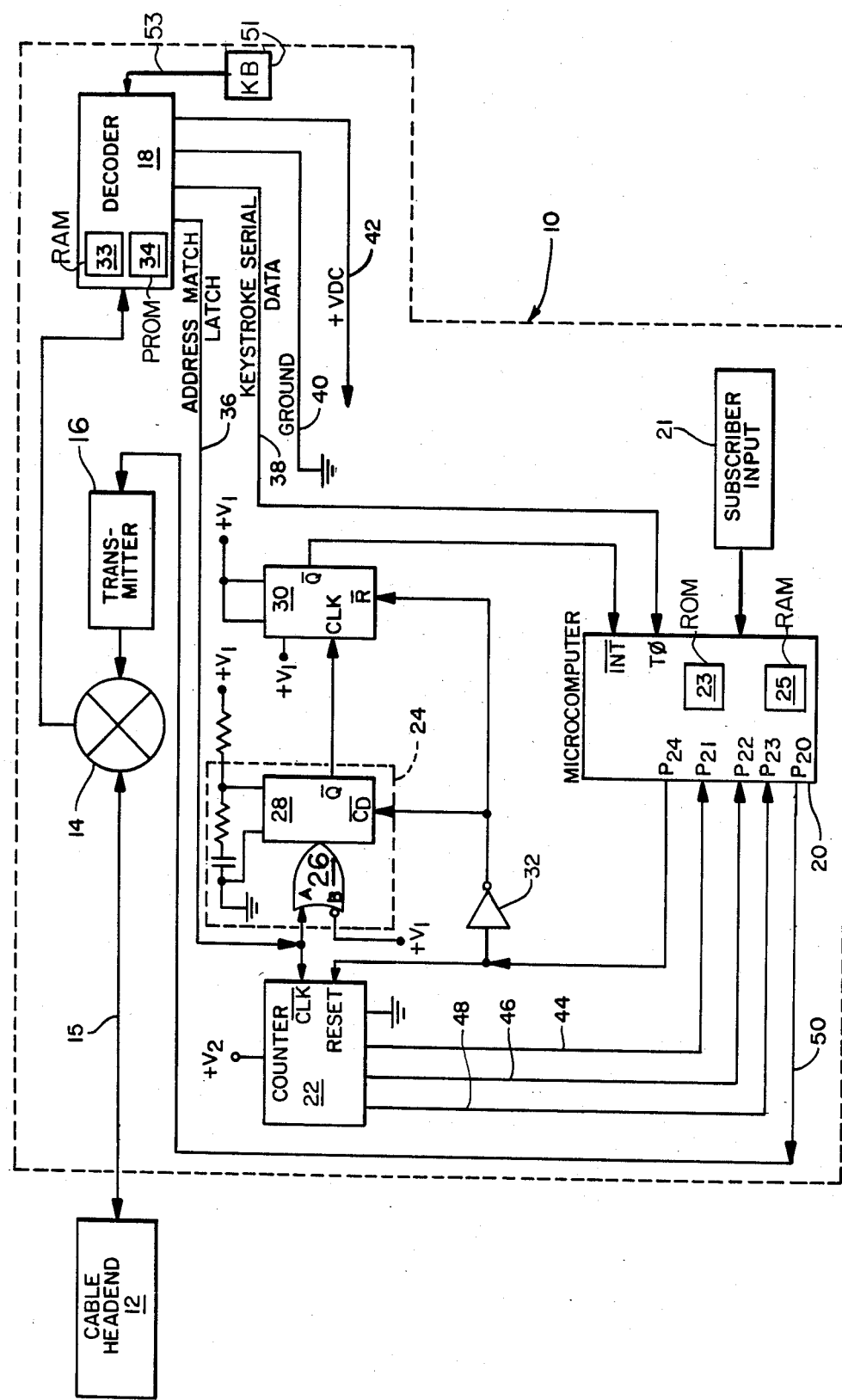
FIG. 1 shows partially in block diagram and partially in schematic diagram form a system for synchronizing upstream data packet time slots with downstream VBI data in a two-way CATV system in accordance with the present invention.

Referring to FIG. 1, there is shown in combined schematic and block diagram form a subscriber terminal 10 for a two-way CATV system in accordance with the present invention. The system also includes a cable headend 12 coupled to each subscriber terminal 10 via a cable 15 and which typically includes a computer, multiple terminals, disc drives and a tape backup. These elements of the cable headend 12 are not shown in FIG. 1 as they do not form a part of the present invention. Downstream television signals from the cable headend 12 to individual subscribers may be encoded to include such information as subscriber address, program authorization, and market codes as well as program identification data which is transmitted in television channels having frequencies between about 50 and 450 MHz. This data may be provided during the vertical blanking interval (VBI) of the downstream video programming signals, such as in lines 10 through 13 of the VBI as shown in Table I. Although the present invention is described herein as making use of VBI lines 10–13 of the video programming signals for the downstream transmission of subscriber data, it is not limited to the use of these VBI lines and may utilize any portion of the vertical retrace signal including any combination of VBI lines, consecutive or nonconsecutive.

TABLE I

| VBI Line 10 | m-BIT ADDRESS CODE | n-BIT AUTHORIZATION CODE |
|---|---|---|
| VBI Line 11 | m-BIT ADDRESS CODE | n-BIT AUTHORIZATION CODE |
| VBI Line 12 | m-BIT ADDRESS CODE | n-BIT AUTHORIZATION CODE |
| VBI Line 13 | x-BIT MARKET CODE | y-BIT PROGRAM TAG |

The VBI occurs during vertical retrace of the raster scanned cathode ray tube (CRT) of the subscriber's television receiver and comprises about 21 horizontal scanning lines. Referring to Table I above, in a known one-way addressable CATV system an m-bit subscriber address code and a related n-bit program authorization code are selectively transmitted during each of lines 10, 11 and 12 of the VBI. During line 13 of the VBI there is continuously transmitted an x-bit system address called a market code which defines the geographic area in which the system is operating as well as a y-bit program identification code, or tag, defining the accompanying television program. These downstream signals are received by each subscriber terminal 10 and coupled by a diplex filter 14 to a decoder 18 which includes a suitable tuner tuned to an encoded CATV channel. Each received m-bit address code is compared with a unique subscriber address code stored in a programmable read only memory (PROM) 34 of decoder 18 in each subscriber terminal 10. If the received subscriber address code matches the unique subscriber address code stored in the decoder's PROM 34, the program authorization code of the same VBI line is stored in a random access memory (RAM) 33 in decoder 18 which defines the program decode authorization status of the subscriber. A match between the received and stored address codes will also result in the generation of an address match latch (AML) pulse by decoder 18, which pulse is provided on an output line 36 of decoder 18.

The x-bit market code received during line 13 of each VBI is compared with a subscriber terminal market code also stored in the decoder's PROM 34. A match between the transmitted and stored market codes will enable the decoder 18 and also result in the generation of an address match latch (AML) pulse which is also provided on line 36. A match between the received y-bit program tag code and the stored program decode authorization status permits the decoder to descramble the received CATV video programming signal which may then be viewed on the subscriber's television receiver (not shown). The absence of a match between the received program tag code and the stored program authorization status results in the video programming signal being passed on by the subscriber terminal 10 in a scrambled form.

As previously mentioned, each match between a received subscriber address code and the unique subscriber address code stored in PROM 34 of decoder 18 results in an AML pulse on line 36 as does each match between a received market code and the stored market code. Since a market code initiated AML pulse is generated during horizontal line 13 of each VBI, a highly reliable vertical rate signal is produced on line 36. According to the present invention, this vertical rate signal is used to synchronize the time slots used for upstream data transmission from all of the subscriber terminals 10 to the headend 12.

With further reference to FIG. 1, the AML pulses developed on line 36 by decoder 18 are coupled to a binary counter 22 and to a one-shot monostable multivibrator 24. Various other signals are also output by decoder 18. These signals include keystroke serial data provided via line 38 to a microcomputer 20. This keystroke serial data may include such information as channel number selection, cable selection, or program authorization requests as provided to decoder 18 via line 53 by a subscriber input device such as a keyboard 51. The decoder 18 is coupled to ground potential via line 40. Finally, decoder 18 provides a +VDC output to the various components of the CATV subscriber terminal 10 as required.

Figure 2:
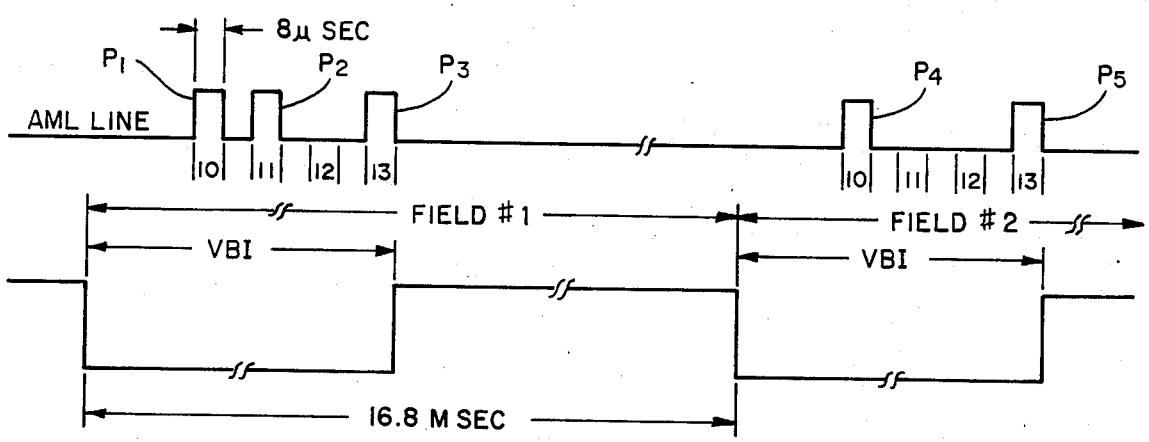
FIG. 2 shows the timing of vertical blanking intervals and address match signals generated when a subscriber address match occurs.

The AML pulses are provided by decoder 18 to counter 22 and monostable multivibrator 24 in the form of 8 microsecond pulses with an interval of 64 microseconds being provided between adjacent pulses, as shown in FIG. 2. As disclosed in the referent copending application, various combinations of the AML pulses are formed during each VBI by selectively transmitting appropriate address codes for selectively commanding each terminal from the headend. For example, the pulse diagram of FIG. 2 shows three AML pulses $P_1$, $P_2$ and $P_3$ occurring during the VBI of a first 16.8 millisecond field. AML pulses $P_1$ and $P_2$ represent subscriber address code matches during VBI 10 and 11 while AML pulse $P_3$ represents a market code match during VBI line 13. It will be appreciated that the market code match AML pulse $P_3$ cannot be used to represent any data since it is transmitted during every VBI by the headend. During the VBI of the subsequent field, an AML pulse $P_4$ represents an address code match during VBI line 10 and an AML pulse $P_5$ represents a market code match during VBI line 13.

The AML pulses produced on line 36 are provided to the A input of an OR gate 26, which in combination with a retriggerable multivibrator circuit 28 forms one-shot monostable multivibrator 24. The inverted B pin of OR gate 26 is coupled to a $+V_1$ source. The output of monostable multivibrator 24 is provided, in turn, to a D-type flip-flop circuit 30 which provides a timed output to the $\overline{INT}$ input pin of microcomputer 20 for initiating an interrupt therein. Following receipt from flip-flop 30 of an interrupt signal provided to its $\overline{INT}$ input pin, microcomputer 20, which in a preferred embodiment is an 8048 microcomputer with a 2K ROM and a 64 byte RAM, finishes its current operation, or task, and executes a time slot generating subroutine as more fully described hereinafter. Each AML pulse provided to OR gate 26 triggers multivibrator 28 for initiating a negative-goint pulse at its $\overline{Q}$ output which is coupled to the CLK input of D-type flip-flop circuit 30. The RC time constant of the circuit coupled to multivibrator 28 is selected such that the width of this negative-going pulse is about 250 microseconds in a preferred embodiment. D-type flip-flop 30 is triggered by the positive going edge of the $\overline{Q}$ output of multivibrator 28. It will be recalled that an AML pulse is produced by decoder 18 during horizontal line 13 of each field in response to a market code match. The 250 microsecond duration of the output of monostable multivibrator 28 is of sufficient length to insure triggering or clocking of flip-flop 30 only 250 microseconds after this market code induced horizontal line 13 AML pulse so as to provide a precise timing reference signal at its $\overline{Q}$ output. In particular, multivibrator 28 will be triggered or retriggered by the horizontal line 13 AML pulse regardless of the number of AML pulses preceding it in a given field and before producing a positive-going output transition such that the $\overline{Q}$ output of flip-flop 30 will go low at a fixed time each field, i.e., 250 microseconds after the horizontal line 13 AML pulse.

Counter 22 is a binary counter, to the $\overline{CLK}$ output of which is provided the AML pulses. Counter 22 provides binary outputs via lines 44, 46 and 48 to the $P_{21}$, $P_{22}$, and $P_{23}$ input pins of microcomputer 20. Counter 22 is reset by an output provided from the $P_{24}$ output pin of microcomputer 20 to the RESET input of counter 22. It is by means of the binary output signals from counter 22 that the number of AML pulses received by decoder 18 is provided to microcomputer 20 for decoding headend commands as explained in the referent copending application.

The $\overline{Q}$ output from flip-flop circuit 30 is provided to the $\overline{INT}$ (Interrupt) input pin of microcomputer 20 for initiating an interrupt in the operation thereof. Following receipt from flip-flop 30 of an interrupt signal provided to its $\overline{INT}$ input pin, microcomputer 20, which in a preferred embodiment of the present invention is an 8048 microcomputer with a 1K ROM and a 64 byte RAM, finishes its current operation, or task, and executes a subroutine shown in simplified flow chart form in FIG. 4 and described below. Following a predetermined time interval as established by the operating program in the microcomputer's ROM 23, microcomputer 20 provides a reset pulse from its $P_{24}$ output pin to the RESET input of counter 22 and, via inverter 32 to the CLEAR ($\overline{C}_D$) and RESET ($\overline{R}$)inputs of multivibrator 24 and D-type flip-flop 30, respectively. The reset output from microcomputer 20 prepares counter 22 and the combination of one-shot monostable multivibrator 24 and D-type flip-flop 30 for receipt of the AML pulses from decoder 18 during the next VBI.

Figure 3:
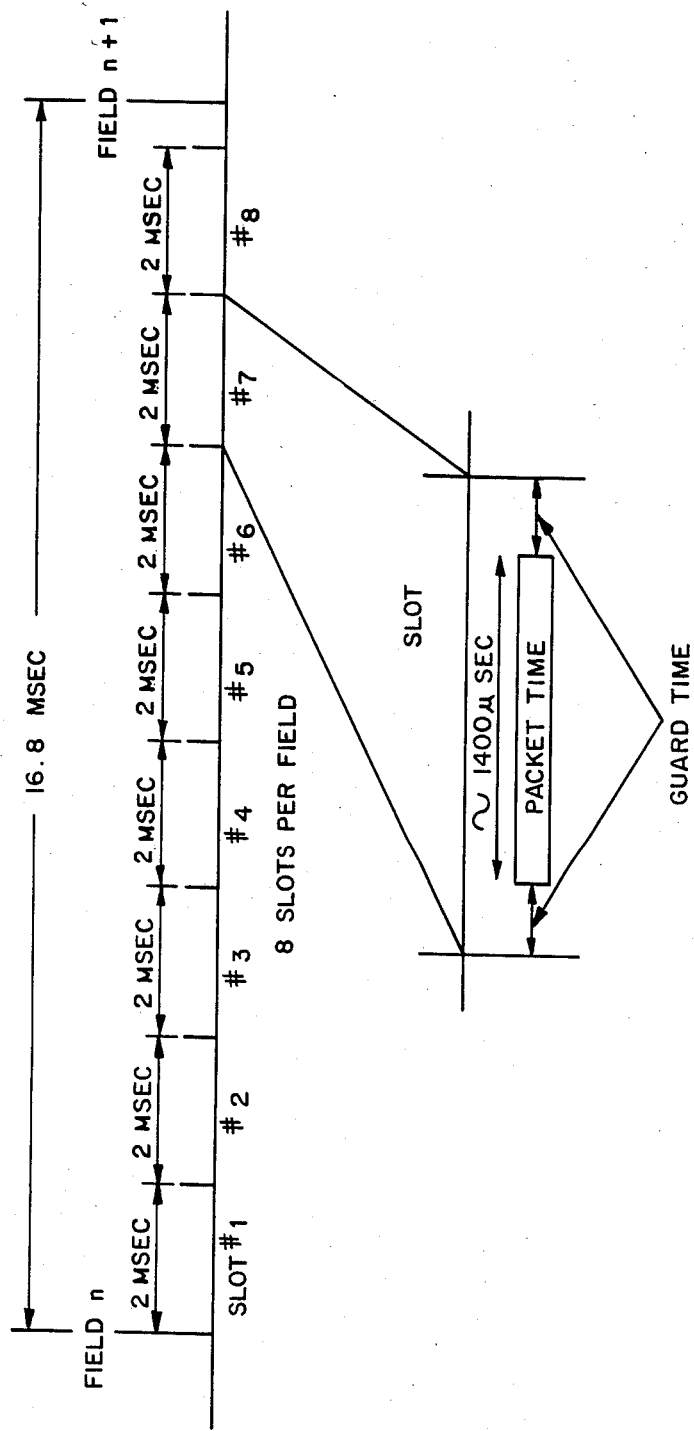
FIG. 3 illustrates the time slot configuration for upstream data packet transmissions for use in the system of FIG. 1.

With microcomputer 20 interrupted 250 microseconds after the market code induced horizontal line 13 AML pulses, an internal software timer in the microcomputer 20 divides the subsequent 16.8 millisecond raster scan field into 8 equal time slots as shown in FIG. 3. Thus, each raster scan field is divided into 8 slots of approximately 2 milliseconds. A data packet of approximately 1400 microseconds in length may then be positioned within a respective time slot by means of a "slotted aloha" data packet transmission approach well known to those skilled in the art. The data packets are positioned within a packet time interval in a respective time slot, with a guard time positioned fore and aft of the packet time interval within each slot. The guard time insures data packet positioning exactly within a respective slot and prevents the overlapped transmission of adjacent data packets. Each data packet is thus separated from an adjacent data packet by a well-defined time interval and all data packets are synchronized with respect to a vertical rate component of the downstream signal; in particular, the market code induced AML pulse on horizontal line 13 of each VBI. The information provided in the individual data packets may be the result of subscriber entries, such as program requests, on a conventional subscriber input device 21 coupled to microcomputer 20, or headend-initiated subscriber interrogation. The data packets are provided from the $P_{20}$ output pin of microcomputer 20 via line 50 to transmitter 16 and thence to diplex filter 14 for transmission to the cable headend 12 via cable 15. Subscriber inputs entered in input device 51 and would be provided via decoder 18 to microcomputer 20 as keystroke serial data.

Table II shows a preferred arrangement for the transmission of upstream data packets for use in the present invention. Upstream data may be transmitted on four separate channels designated T7, T8, T9 and T10. The frequency bands in which these channels are transmitted are: 5–12 MHz, 12–18 MHz, 18–24 MHz, and 24–30 MHz, respectively. However, the present invention is not limited to this upstream data packet transmission arrangement as these details are provided only for disclosing a preferred arrangement of the present invention.

TABLE II

| UPSTREAM DATA CHANNEL | T7 | T8 | T9 | T10 |
|---|---|---|---|---|
| FREQUENCY BAND | 5–12 MHz | 12–18 MHz | 18–24 MHz | 24–30 MHz |

Figure 4:
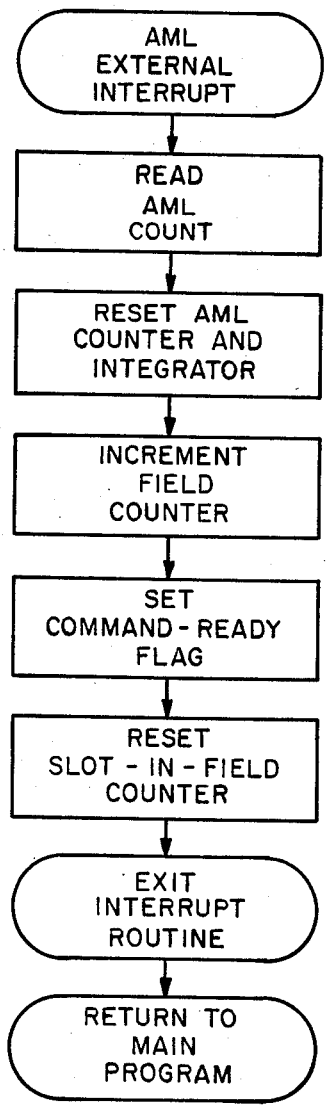
FIG. 4 is a simplified flow chart showing the sequence of operations carried out by a microcomputer in synchronizing upstream data packet time slots with downstream VBI data for a two-way CATV system in accordance with the present invention.

Referring to FIG. 4, there is shown a simplified flow chart of the program executed in microcomputer 20 in synchronizing the data packet time slots with the VBI signals received from the cable headend 12. Microcomputer 20 initially undergoes an AML external interrupt upon the receipt of a Q output from D-type flip-flop circuit 30. This interrupt follows VBI line 13 by 250 microseconds in a preferred embodiment. The program stored in the microcomputer's ROM 23 then reads the AML count as provided to microcomputer 20 from counter 22 via lines 44, 46 and 48. A reset pulse is then provided via the $P_{24}$ output pin of microcomputer 20 to the RESET input of counter 22 and the CLEAR and RESET inputs of multivibrator 24 and D-type flip-flop circuit 30, respectively. A field counter within microcomputer 20 is then incremented by one. A COMMAND-READY flag is then set in microcomputer 20 for the purpose of examining the contents of a random access memory (RAM) 25 within microcomputer 20 in order to determine what action is to be taken by the subscriber's unit upon command receipt. The program then resets a SLOT-IN-FIELD counter in the form of a software timer within microcomputer 20 in order to synchronize the slots in the raster scan field with the address match signal provided by decoder 18 to monostable multivibrator 24. The SLOT-IN-FIELD counter continues to count in 250 microsecond increments by means of an internal timer interrupt generated in microcomputer 20 in order to properly clock out the slots in each of the raster scan fields. The program then exits the interrupt routine and returns to the main program in continuing to exercise system control.

There has thus been shown a synchronization system for a two-way CATV system in which upstream data packets may be inserted in time slots synchronized with the downstream video signal VBI. Upstream data packets are transmitted in VBI-synchronized time slots for reducing data transmission errors and increasing data through-put to the CATV headend in a multi-subscriber slotted contention system.

While particular embodiments of the present invention have been shown and described, it will be obvious to those skilled in the art that changes and modifications may be made without departing from the invention in its broader aspects. Therefore, the aim of the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A time sloted aloha two-way CATV system wherein video signals having a vertical rate signal component are transmitted downstream on a cable from a headend to a plurality of subscriber terminals and each subscriber terminal may in turn transmit upstream data packets to said headend on said cable, said system comprising:
    signal detection means for detecting said vertical rate signal component and generating a timing reference signal in response thereto; and
    signal processing means coupled to said signal detection means and responsive to said timing signal for dividing the next succeeding raster scan field into a plurality of equal time slots in predetermined time relation to said timing signal in which said data packets may be inserted for upstream transmission.

2. A system as in claim 1 wherein said vertical rate signal is transmitted during the vertical blanking interval of said video signals.

3. A system as in claim 2 wherein said vertical rate signal is transmitted during a designated line of the vertical blanking interval of said video signals.

4. A system as in claim 1 wherein said vertical rate signal component comprises a vertical rate coded control signal for controlling subscriber terminal response to said video signals.

5. A system as in claim 1 wherein said raster scan field is divided into eight time slots of equal duration.

6. In a time slotted aloha two-way CATV system including means for transmitting program video signals over a plurality of CATV channels from a headend to a plurality of CATV subscriber terminals by means of a cable, wherein said video signals include a control code transmitted in the vertical blanking interval thereof, each subscriber terminal comprising:
    decoder means coupled to said headend by means of said cable for detecting each occurrence of said control code for generating a first timing signal in timed relation thereto;
    signal processing means coupled to said decoder means for dividing the next succeeding raster scan field of said video signal into a plurality of equal time slots in predetermined time relation to said first timing signal and for generating a second timing signal synchronous with said plurality of time slots; and
    transmitter means coupled to said headend by means of said cable and to said signal processing means and responsive to said second timing signal for selectively transmitting a data packet during a respective one of said time slots to said CATV headend.

7. A subscriber terminal as in claim 6 wherein said decoder means includes memory means wherein is stored system address information for comparison with said control code for the generation of a match signal representing said first timing signal when said system address information and said control code match.

8. A subscriber terminal as in claim 7 wherein said signal processing means includes a microcomputer responsive to said first timing signal and including an interval timer for dividing the next succeeding raster scan field into a plurality of equal time slots.

9. A subscriber terminal as in claim 8 wherein said signal processing means selectively provides a data packet to said transmitter means within a respective time slot.

10. A subscriber terminal as in claim 8 wherein each raster scan field is divided into 8 equal time slots.

11. A subscriber terminal as in claim 10 wherein each time slot is 2 milliseconds and each data packet is 1400 microseconds in length.

12. In a two-way CATV system including means for transmitting program video signals downstream over a plurality of channels by means of a cable from a headend to a plurality of CATV subscriber terminals and wherein data may be transmitted upstream from each CATV subscriber terminal to said headend by means of said cable and wherein said video signals include a raster scan field portion and a vertical blanking interval portion having a plurality of retrace lines in which a control code is transmitted downstream to each of said subscriber terminals, each of said subscriber terminals comprising:

decoder means coupled to said headend by means of said cable, said decoder means including memory means for storing system address information, for comparing said control code with said system address information and for selectively generating a match signal when said control code and said system address information match, wherein said match signal is in timed relation with the control code in the retrace lines of said vertical blanking interval;

signal processing means coupled to said decoder means and responsive to said match signal and including interval timing means for dividing the next succeeding raster scan field into a plurality of time slots of equal duration which are synchronized with said control code and for selectively generating a data packet synchronous with a time slot; and transmitter means coupled to said headend by means of said cable and further coupled to said signal processing means and responsive thereto for transmitting said data packet to said headend within a selected one of said time slots.

13. A method for providing data upstream in a two-way CATV system from a subscriber terminal to a headend by means of a cable connected therebetween, wherein video program signals including a vertical rate signal and a raster scan field are provided downstream from said headend to said subscriber terminal, said method comprising:

detecting said vertical rate signal;

dividing the next raster scan field into a plurality of equal time slots in timed relation to the detected vertical rate signal;

selectively generating a data packet synchronous with one of said time slots; and transmitting said data packet upstream to said headend in the next raster scan field within said one time slot.

14. A method as in claim 13 further including the steps of:

transmitting a control code downstream during said vertical blanking interval for controlling subscriber terminal response to said video program signals; and detecting said control code in providing a timing reference signal relative to said next raster scan field.

15. A method as in claim 14 further including the steps of comparing said control code with a system address code stored in each subscriber terminal and generating a timing signal when said control code and said system address code match for dividing the next raster scan field following said control code into said plurality of equal time slots.

16. A method as in claim 15 further comprising the step of transmitting said control code during a designated retrace line of said vertical blanking interval.

* * * * *